United States Patent
Ikemoto et al.

(10) Patent No.: US 9,537,735 B2
(45) Date of Patent: Jan. 3, 2017

(54) DATA COLLECTION METHOD, MOBILE TERMINAL AND DATA STORAGE DEVICE

(71) Applicant: FUJITSU LIMITED, Kawasaki-shi (JP)

(72) Inventors: Kentaro Ikemoto, Kawasaki (JP); Kazuo Sasaki, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/725,546

(22) Filed: May 29, 2015

(65) Prior Publication Data

US 2015/0263910 A1 Sep. 17, 2015

Related U.S. Application Data

(62) Division of application No. 13/738,007, filed on Jan. 10, 2013, now Pat. No. 9,078,159.

(30) Foreign Application Priority Data

Mar. 29, 2012 (JP) ................ 2012-077853

(51) Int. Cl.
*H04L 12/58* (2006.01)
*H04M 1/725* (2006.01)
(Continued)

(52) U.S. Cl.
CPC ............ *H04L 43/04* (2013.01); *H04L 67/10* (2013.01); *H04W 4/006* (2013.01); *H04W 28/06* (2013.01); *H04W 4/008* (2013.01)

(58) Field of Classification Search
CPC ...... H04W 28/06; H04W 4/008; H04W 4/006; H04W 4/12; H04W 88/02; H04W 8/245; H04W 24/02; H04L 12/5895; H04L 29/08108; H04M 1/72547; H04M 1/72525; H04M 1/72522
(Continued)

(56) References Cited

U.S. PATENT DOCUMENTS 6,478,748 B1 11/2002 Kuhn et al.
6,928,263 B2 * 8/2005 Blake .................. H04B 1/713
375/E1.033
(Continued)

FOREIGN PATENT DOCUMENTS

JP 4-180137 6/1992
JP 2002-512829 5/2002
(Continued)

OTHER PUBLICATIONS

Japanese Office Action dated Sep. 15, 2015 in corresponding Japanese Patent Application No. 2012-077853.
(Continued)

*Primary Examiner* — Nhan Le
(74) *Attorney, Agent, or Firm* — Staas & Halsey LLP

(57) ABSTRACT

A first mobile terminal requests a device to transmit data, on the basis of a processing request transmitted from a management server. The device transmits the requested data to the first mobile terminal. The first mobile terminal generates processed data by using the data received from the device. The first mobile terminal assigns an identifier to the processed data. The first mobile terminal transmits the processed data in association with the identifier to the management server. The first mobile terminal transmits an association relationship between the identifier and the data used for generating the processed data to the device. The device stores the identifier in association with the transmitted data. A second mobile terminal transmits to the device an identifier transmitted from the management server as an identifier associated with data to be deleted. The device identifies data associated with the identifier received from the second mobile terminal.

7 Claims, 14 Drawing Sheets

(51) Int. Cl.
*H04L 12/26* (2006.01)
*H04W 28/06* (2009.01)
*H04W 4/00* (2009.01)
*H04L 29/08* (2006.01)

(58) Field of Classification Search
USPC ..... 455/41.1, 41.2, 418–420, 500, 507, 517, 455/550.1, 552.1, 553.1, 412.1, 412.2, 455/422.1, 424, 425, 432.1, 435.1, 435.2
See application file for complete search history.

(56) References Cited

U.S. PATENT DOCUMENTS

| | | | |
|---|---|---|---|
| 7,613,811 | B1 | 11/2009 | Bhalla |
| 7,693,506 | B1 * | 4/2010 | Back ............... H04W 60/00 455/432.1 |
| 7,860,917 | B2 | 12/2010 | Moriwaki |
| 8,095,149 | B2 | 1/2012 | Manson et al. |
| 8,676,162 | B2 * | 3/2014 | Rathus ............ H04M 1/274516 370/352 |
| 2011/0159806 | A1 | 6/2011 | Yamada et al. |
| 2012/0270524 | A1 * | 10/2012 | Venkataramu ...... H04L 63/0853 455/411 |
| 2013/0090097 | A1 | 4/2013 | Klassen |

FOREIGN PATENT DOCUMENTS

| | | |
|---|---|---|
| JP | 2005-169090 | 6/2005 |
| JP | 2007-158905 | 6/2007 |
| JP | 2011-139186 | 7/2011 |

OTHER PUBLICATIONS

Restriction Requirement issued Sep. 24, 2014 in related U.S. Appl. No. 13/738,007.
Quayle Office Action issued Jan. 29, 2015 in related U.S. Appl. No. 13/738,007.
Notice of Allowance issued Mar. 18, 2015 in related U.S. Appl. No. 13/738,007.
U.S. Appl. No. 13/738,007, filed Jan. 10, 2013, Kentaro Ikemoto et al., Fujitsu Limited.

* cited by examiner

FIG. 3

| PROCESSED DATA NAME | CONSTITUENT ELEMENTS | RECEPTION STATES |
|---|---|---|
| PD_1 | RD_1 | RECEIVED |
| | RD_2 | NOT RECEIVED |
| | RD_3 | RECEIVED |
| | RD_4 | NOT RECEIVED |

FIG. 4

| PROCESSED DATA NAME | UNIQUE ID | CONSTITUENT ELEMENTS |
|---|---|---|
| PD_1 | 001 | RD_1 |
| | | RD_2 |
| | | RD_3 |
| | | RD_4 |

DATA COLLECTION METHOD, MOBILE TERMINAL AND DATA STORAGE DEVICE

CROSS-REFERENCE TO RELATED APPLICATION

This application is a divisional of U.S. application Ser. No. 13/738,007 filed Jan. 10, 2013, which is based upon and claims the benefit of priority of the prior Japanese Patent Application No. 2012-077853, filed on Mar. 29, 2012, the entire contents of which are incorporated herein by reference.

FIELD

The embodiments discussed herein are related to a data collection method, a mobile terminal and a data storage device.

BACKGROUND

In recent years, M2M services that enable devices connected to a network to exchange information with each other without a person and automatically execute the optimal control are widely used. In addition, cloud systems that provide M2M services are becoming widely adopted. For example, there is a system in which wireless communication terminals form an ad-hoc network and a cloud server collects information such as sensor values from the wireless communication terminals.

In order to suppress an introduction cost, a phone line or a third generation network is used. For example, the cloud server collects operating states and states of consumable supplies from remote devices on behalf of customers. Then, customer monitoring agents use mobile phones to access the cloud server and figure out the states of the devices.

Japanese National Publication of International Patent Application No. 2002-512829 and Japanese Laid-open Patent Publication No. 2005-169090 disclose related techniques.

SUMMARY

According to an aspect of the present invention, provided is a data collection method. In the method, a first mobile terminal requests a device to transmit data, on the basis of a processing request transmitted from a management server. The device transmits the requested data to the first mobile terminal. The first mobile terminal receives the transmitted data. The first mobile terminal generates processed data by using the received data. The first mobile terminal assigns an identifier to the processed data. The first mobile terminal transmits the processed data in association with the identifier to the management server. The first mobile terminal transmits an association relationship between the identifier and the data used for generating the processed data to the device. The device stores the identifier in association with the transmitted data. A second mobile terminal transmits to the device an identifier transmitted from the management server as an identifier associated with data to be deleted. The device receives the identifier transmitted from the second mobile terminal. The device identifies data associated with the received identifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of information stored in a work buffer;

FIG. 4 is a diagram illustrating an example of information stored in an association list;

DESCRIPTION OF EMBODIMENTS

A communication cost for the third generation network, however, is high. In addition, if the system is large, a load of the cloud server is high. Thus, it may be considered that the communication cost is suppressed by using Wireless Fidelity (Wi-Fi) instead of the third generation network and the load of the cloud server is reduced by causing terminals such as smart phones to process data or the like. In such a case, however, the amount of traffic in a network is large.

Smart phones that execute communication by using Wi-Fi will be described below as an example. A smart phone that is located near a cloud server receives a request to process data from the cloud server. The smart phone that has received the processing request collects the data to be used for the processing from a device and generates processed data. The smart phone transmits the processed data to the cloud server. Upon receiving the processed data, the cloud server transmits a deletion request to a smart phone located near the cloud server. The smart phone that has received the deletion request deletes the data used for the processing from the device.

In a system that uses Wi-Fi and smart phones, a terminal that collects data may be different from a terminal that deletes the data. Thus, devices manage an association relationship between processed data and data used for generating the processed data. The devices transmit and receive the processed data and the deletion request, which are accompanied with the data used for processing. As a result, the data amounts of packets become large and the amount of traffic in a network becomes large. In addition, the system may cause a packet transmission error and a packet loss, thus reducing the reliability of the system.

Hereinafter, embodiments of a data collection method, a mobile terminal and a data storage device will be described in detail with reference to the accompanying drawings. The data collection method, the mobile terminal and the data storage device, however, are not limited to the embodiments.

First Embodiment

Overall Configuration of System

Figure 1:
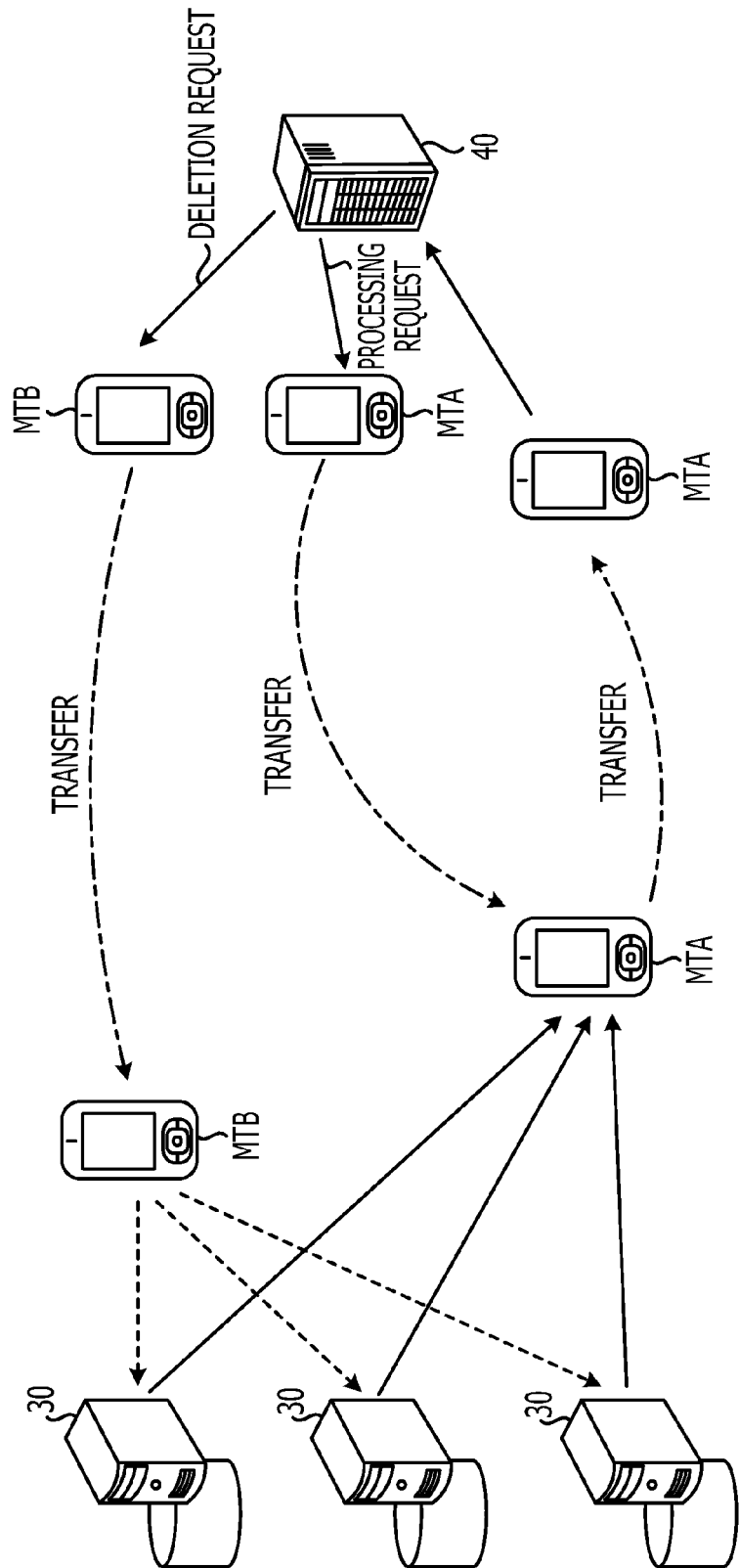
FIG. 1 is a diagram illustrating an example of an overall configuration of a system according to a first embodiment.

FIG. 1 is a diagram illustrating an example of an overall configuration of a system according to a first embodiment. As illustrated in FIG. 1, the system includes a mobile terminal MTA, a mobile terminal MTB, data storage servers 30 and a management server 40. In the system, the management server 40 and the data storage servers 30 do not directly execute data communication with each other. The number of mobile terminals, the number of servers and the like are examples and not limited to those illustrated in FIG. 1.

The mobile terminals MTA and MTB are wireless communication devices such as smart phones or mobile phones and held by users. The mobile terminals MTA and MTB execute near field communication by using Wi-Fi or the like and may thereby wirelessly communicate with the data storage servers 30 and the management server 40.

The data storage servers 30 are server devices that stores data. The data storage servers 30 store data generated by the devices, for example, backup results, system logs, error logs, and the like. The data storage servers 30 execute near field communication by using Wi-Fi or the like and may thereby wirelessly communicate with the mobile terminals MTA and MTB and the management server 40.

The management server 40 is a server device that collects data held by the data storage servers 30 and manages the collected data. The management server 40 corresponds to a cloud server for the mobile terminals MTA and MTB. The management server 40 executes near field communication by using Wi-Fi or the like and may thereby wirelessly communicate with the mobile terminals MTA and MTB and the data storage servers 30.

In the aforementioned state, the mobile terminal MTA comes close enough to the management server 40 to communicate with the management server 40 by using Wi-Fi, as the user of the mobile terminal MTA transfers. The management server 40 detects the presence of the mobile terminal MTA by using Wi-Fi and transmits a request to process data to the mobile terminal MTA. The mobile terminal MTA that has received the processing request comes close enough to the data storage servers 30 to communicate with the data storage servers 30 by using Wi-Fi, as the user of the mobile terminal MTA transfers.

Then, the mobile terminal MTA uses Wi-Fi to transmit, to the data storage servers 30, a request to acquire raw data to be used for the data processing. After that, the mobile terminal MTA uses the raw data acquired from the data storage servers 30 to generate processed data and assigns a unique identifier (ID) to the generated processed data. In this example, the unique ID is assigned after the generation of the processed data. However, the unique ID may be assigned to the processed data to be generated, before the generation of the processed data.

The mobile terminal MTA transmits an association relationship between the raw data used for the processing and the unique ID to the data storage servers 30. The data storage servers 30 hold the association relationship between the raw data transmitted to the mobile terminal MTA and the unique ID.

After that, the mobile terminal MTA that holds the processed data comes close enough to the management server 40 to communicate with the management server 40 by using Wi-Fi, as the user transfers. Then, the mobile terminal MTA transmits the processed data to the management server 40 by using Wi-Fi. In this manner, the management server 40 may collect the processed data generated from the data held by the data storage servers 30.

When the management server 40 detects the presence of the mobile terminal MTB by using Wi-Fi, the management server 40 transmits an acknowledgment (ACK) containing the unique ID to the mobile terminal MTB. The ACK is a response corresponding to the request to process the data. The mobile terminal MTB that has received the ACK comes close enough to the data storage servers 30 to communicate with the data storage servers 30 by using Wi-Fi, the user of the mobile terminal MTB transfers.

Then, the mobile terminal MTB transmits the ACK to the data storage servers 30 by using Wi-Fi. The data storage servers 30 identify the raw data associated with the unique ID contained in the received ACK. After that, the data storage servers 30 delete the identified raw data, for example. In this manner, the management server 40 may delete the raw data used for generating the processed data by using the transfer of the mobile terminal MTB.

As described above, when the data storage servers 30 and the management server 40 communicate with each other by using the near field communication with a plurality of mobile terminals, a unique ID is associated with data to be transmitted from the data storage servers 30 to the management server 40. The same unique ID is associated with an ACK to be transmitted from the management server 40 to the data storage servers 30. Then, the ACK is transmitted. Thus, even when a terminal that collects data is different from a terminal that deletes the data, a common unique ID within the system may be transmitted, and the amount of traffic may be suppressed.

Configurations of Mobile Terminals

Figure 2:
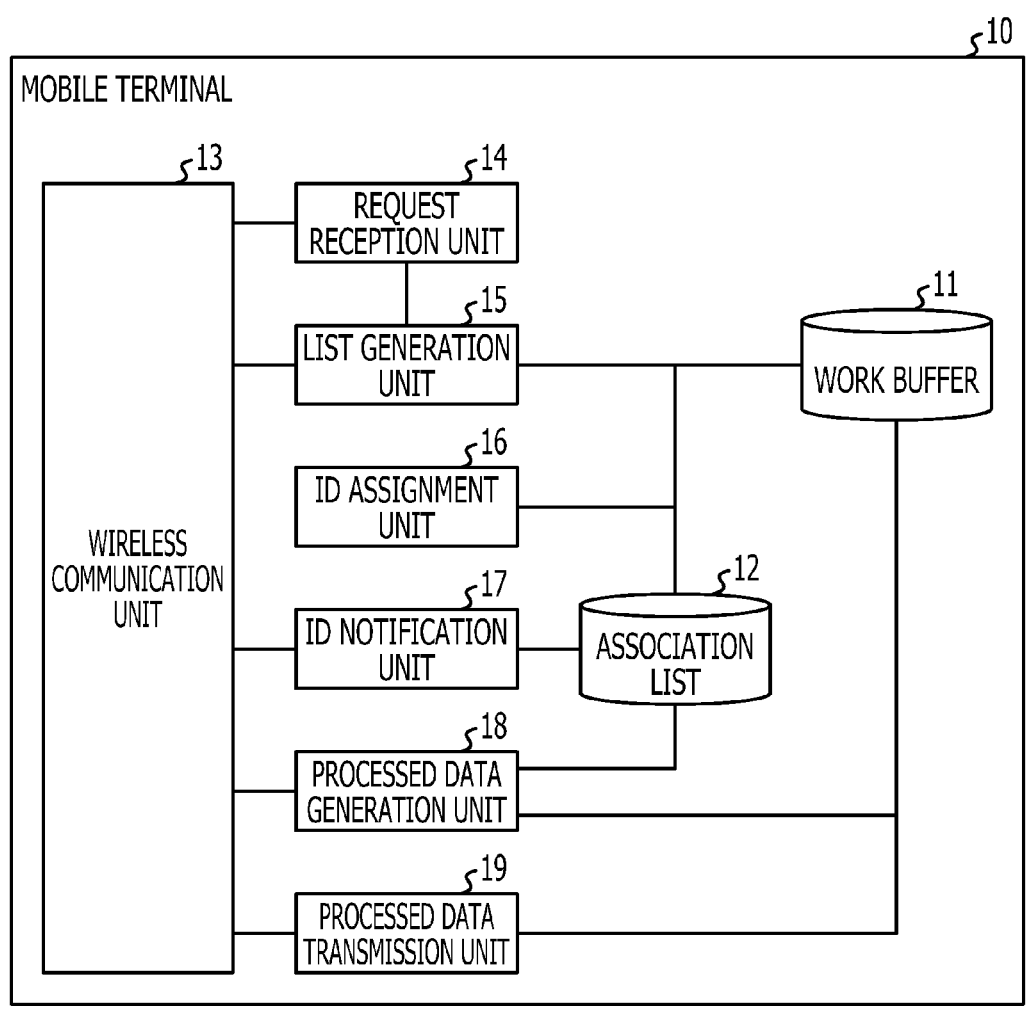
FIG. 2 is a functional block diagram illustrating a configuration of a mobile terminal according to a first embodiment.

Next, configurations of the mobile terminals MTA and MTB illustrated in FIG. 1 will be described. The mobile terminals MTA and MTB have the same configuration and the same configuration will be described as a configuration of a mobile terminal 10. FIG. 2 is a functional block diagram illustrating a configuration of the mobile terminal 10 according to the first embodiment.

As illustrated in FIG. 2, the mobile terminal 10 includes a work buffer 11, an association list 12, a wireless communication unit 13, a request reception unit 14, a list generation unit 15, an ID assignment unit 16, an ID notification unit 17, a processed data generation unit 18 and a processed data transmission unit 19. These processing units of the mobile terminal 10 are achieved by causing a processor such as a central processing unit (CPU) to execute a program. The work buffer 11 is a storage device such as a memory or a hard disk. The association list 12 is held by a storage device such as a memory or a hard disk.

The work buffer 11 is a storage unit that stores information used by the processed data generation unit 18 to generate processed data or the like. FIG. 3 is a diagram illustrating an example of the information stored in the work buffer 11. As illustrated in FIG. 3, the work buffer 11 stores "a processed data name, constituent elements, and reception states" in association with one another. The information stored in the work buffer 11 is generated and updated by the list generation unit 15 and the processed data generation unit 18.

The "processed data name" is an identifier that identifies the processed data requested by the management server 40. For example, the name of the processed data, the ID of the processed data, or the like is set in an item for the "processed data name" in the work buffer 11. The "constituent elements" are identifiers that identify raw data to be used for generating the processed data. For example, the names of the raw data, the IDs of the raw data, or the like are set in items for the "constituent elements" in the work buffer 11. The "reception states" are information that indicates whether or not the mobile terminal 10 has received the raw data from the data storage servers 30. In the example illustrated in FIG. 3, the processed data with an identifier "PD_1" may be generated from the raw data with identifiers "RD_1", "RD_2", "RD_3" and "RD_4". In the example illustrated in FIG. 3, the raw data with the identifiers "RD_1" and "RD_3" has been received, and the raw data with the identifiers "RD_2" and "RD_4" is yet to be received.

The association list 12 stores information that indicates an association relationship between a unique ID assigned to the processed data and the raw data that constitutes the processed data. The association list 12 is generated by the list generation unit 15 or the like. FIG. 4 is a diagram illustrating an example of the information stored in the association list 12. As illustrated in FIG. 4, the association list 12 includes "the processed data name, the unique ID and the constituent elements".

The "processed data name" is the identifier that identifies the processed data requested by the management server 40. For example, the name of the processed data, the ID of the processed data, or the like is set in an item for the "processed data name" in the association list 12. The "unique ID" is an identifier that identifies the processed data. The "constituent elements" are the identifiers that identify the raw data to be used for generating the processed data. For example, the names of the raw data, the IDs of the raw data, or the like are set in items for the "constituent elements" in the association list 12. The example illustrated in FIG. 4 indicates that a unique ID "001" is assigned to the processed data that has the identifier "PD_1" and has been generated from the raw data with the identifiers "RD_1", "RD_2", "RD_3" and "RD_4". Thus, the raw data with the identifiers "RD_1", "RD_2", "RD_3" and "RD_4" may be identified by the unique ID "001".

The wireless communication unit 13 is a processing unit that executes the near field wireless communication by using Wi-Fi or the like. For example, while operating a near field wireless communication function, the wireless communication unit 13 detects another device located close enough to the wireless communication unit 13 to communicate with the wireless communication unit 13. The wireless communication unit 13 notifies the processing units that the wireless communication unit 13 has detected a device wirelessly communicable with the mobile terminal 10 and notifies the processing units of information regarding the detected device.

The request reception unit 14 is a processing unit that receives various requests from the management server 40 detected by the wireless communication unit 13. For example, the request reception unit 14 receives a processing request from the management server 40 and outputs the processing request to the list generation unit 15. The request reception unit 14 receives, from the management server 40, an ACK indicating a deletion request and outputs the ACK to the ID notification unit 17.

The list generation unit 15 is a processing unit that generates an association relationship between the processed data and the raw data on the basis of the processing request. For example, the list generation unit 15 extracts, from the processing request received by the request reception unit 14, the identifier of the processed data, the identifiers of the raw data to be used for generating the processed data, and the like. Then, the list generation unit 15 generates information regarding the association relationship between the processed data and the raw data, in which the extracted identifier of the processed data is associated with the extracted identifiers of the raw data.

The ID assignment unit 16 is a processing unit that assigns a unique ID to the association relationship generated by the list generation unit 15. When the list generation unit 15 generates a relationship between the processed data and the raw data, for example, the ID assignment unit 16 issues a unique ID for the relationship. In other words, the ID assignment unit 16 issues the unique ID for the processed data. The ID assignment unit 16 generates the association list 12 in which the identifier of the processed data, the identifiers of the raw data, and the unique ID are associated with one another. In addition, the ID assignment unit 16 notifies the ID notification unit 17 that the association list 12 has been generated.

The ID notification unit 17 is a processing unit that transmits the unique ID to the data storage servers 30. Specifically, the ID notification unit 17 transmits the unique ID corresponding to the data to be used for generating the processed data or the unique ID corresponding to the data to be deleted, through the near field wireless communication using Wi-Fi or the like.

For example, when the association list 12 is generated, the ID notification unit 17 extracts the association relationship between the raw data and the unique ID from the association list 12 and transmits the extracted association relationship to the data storage servers 30. Upon receiving the unique ID from the request reception unit 14, that is, receiving the unique ID contained in the ACK transmitted by the management server 40, the ID notification unit 17 transmits the received unique ID to the data storage servers 30 through the near field wireless communication using Wi-Fi or the like.

The processed data generation unit 18 is a processing unit that generates the processed data in accordance with the processing request received by the request reception unit 14. For example, the processed data generation unit 18 references the association list 12 to generate information to be used to manage reception states of the raw data to be used for generating the processed data and store the generated information in the work buffer 11. Specifically, the processed data generation unit 18 generates a table including the processed data name, the constituent elements and the reception states and stores the table in the work buffer 11.

Then, the processed data generation unit 18 updates the reception states upon receiving the raw data from the data storage servers 30 connected to the mobile terminal 10 through the wireless communication unit 13. Upon receiving all the raw data to be used for generating the processed data, the processed data generation unit 18 generates the processed data. Note that the processing request includes information regarding the processed data and information regarding the raw data. The processed data generation unit 18 stores the generated processed data in the work buffer 11.

The processed data transmission unit 19 is a processing unit that transmits the processed data generated by the processed data generation unit 18 to the management server 40 through the near field wireless communication using Wi-Fi or the like. Specifically, when the work buffer 11 has the processed data stored therein and the management server 40 is detected by the wireless communication unit 13, the processed data transmission unit 19 transmits the processed data to the management server 40 by using Wi-Fi or the like. For example, the processed data transmission unit 19 extracts the association relationship between the processed data and the unique ID from the work buffer 11 and transmits the association relationship to the management server 40.

Configuration of Data Storage Server

Figure 5:
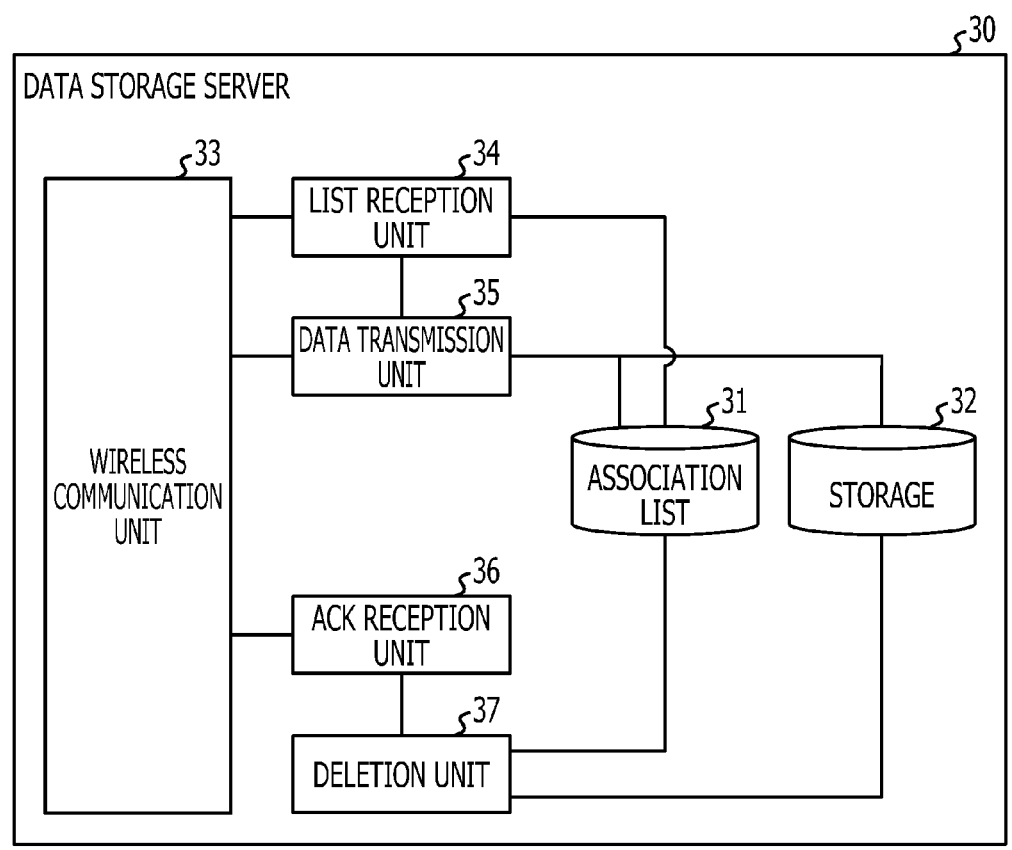
FIG. 5 is a functional block diagram illustrating a configuration of a data storage server according to a first embodiment.

Next, a configuration of the data storage server 30 illustrated in FIG. 1 will be described. FIG. 5 is a functional block diagram illustrating a configuration of the data storage server 30.

As illustrated in FIG. 5, the data storage server 30 includes an association list 31, storage 32, a wireless communication unit 33, a list reception unit 34, a data transmission unit 35, an ACK reception unit 36 and a deletion unit 37. These processing units of the data storage server 30 are achieved by causing a processor such as a CPU to execute a program. The storage 32 is a storage device such as a memory or a hard disk. The association list 31 is held by a storage device such as a memory or a hard disk.

The association list 31 is received from the mobile terminal 10. For example, the stored association list 31 includes the "constituent elements" and the "unique ID" that are included in the association list illustrated in FIG. 4. The association list 31 is stored by the list reception unit 34.

The storage 32 is a storage device that stores raw data. Data stored in a data storage server 30 may not be the same as data stored in another data storage server 30. The data stored in the storage 32 is deleted by the deletion unit 37. A control unit (not illustrated) such as a data generation unit generates the data and stores the data in the storage 32.

The wireless communication unit 33 is a processing unit that executes the near field wireless communication by using Wi-Fi or the like. For example, while operating a near field wireless communication function, the wireless communication unit 33 detects a mobile terminal 10 located close enough to the data storage server 30 to communicate with the data storage server 30. The wireless communication unit 33 notifies the processing units that the wireless communication unit 33 has detected a mobile terminal 10 wirelessly communicable with the data storage server 30 and notifies the processing units of information regarding the detected mobile terminal 10.

The list reception unit 34 is a processing unit that receives the association relationship between the raw data and the unique ID from the mobile terminal 10 detected by the wireless communication unit 33. For example, upon receiving the association relationship between the raw data and the unique ID, the list reception unit 34 causes the received association relationship to be held as the association list 31 in the data storage server 30. The list reception unit 34 outputs, to the data transmission unit 35, information indicating that the association list 31 has been generated.

The data transmission unit 35 is a processing unit that transmits raw data to the mobile terminal 10. Specifically, when the association list 31 is generated by the list reception unit 34, the data transmission unit 35 references the association list 31 to identify the raw data to be used for generating the processed data. Then, the data transmission unit 35 reads the identified raw data from the storage 32 and transmits, through the near field wireless communication executed by the wireless communication unit 33, the raw data to the mobile terminal 10 that has requested the raw data. For example, when the data transmission unit 35 references the association list 31 and identifies the raw data with the identifier "RD_1", the data transmission unit 35 reads the raw data corresponding to the identifier "RD_1" from the storage 32 and transmits the read raw data to the mobile terminal 10.

The ACK reception unit 36 is a processing unit that receives an ACK from the mobile terminal 10 detected by the wireless communication unit 33. Specifically, upon receiving an ACK from the mobile terminal 10, the ACK reception unit 36 extracts the unique ID from the ACK and outputs the extracted unique ID to the deletion unit 37. For example, the ACK reception unit 36 receives, from the mobile terminal 10, an ACK transmitted by the management server 40, extracts a unique ID "001" from the received ACK, and outputs the extracted unique ID "001" to the deletion unit 37.

The deletion unit 37 is a processing unit that deletes raw data from the storage 32. For example, upon receiving the unique ID "001" from the ACK reception unit 36, the deletion unit 37 references the association list 31 and identifies the identifiers "RD_1" and "RD_2" that are associated with the unique ID "001". Then, the deletion unit 37 deletes the raw data corresponding to the identifiers "RD_1" and "RD_2".

The management server 40 has the same configuration as a general management server, and a detailed description thereof is omitted. For example, the management server 40 includes a similar processing unit as the wireless communication unit 33, a processing unit for transmitting a processing request, and a processing unit for transmitting an ACK. The management server 40 causes information regarding processed data to be generated, a method for generating the processed data, and raw data to be used for generating the processed data to be included in a processing request and transmits the processing request to the mobile terminal 10. In addition, the management server 40 transmits an ACK containing a unique ID corresponding to data to be deleted to the mobile terminal 10.

Data Processing

Figure 6:
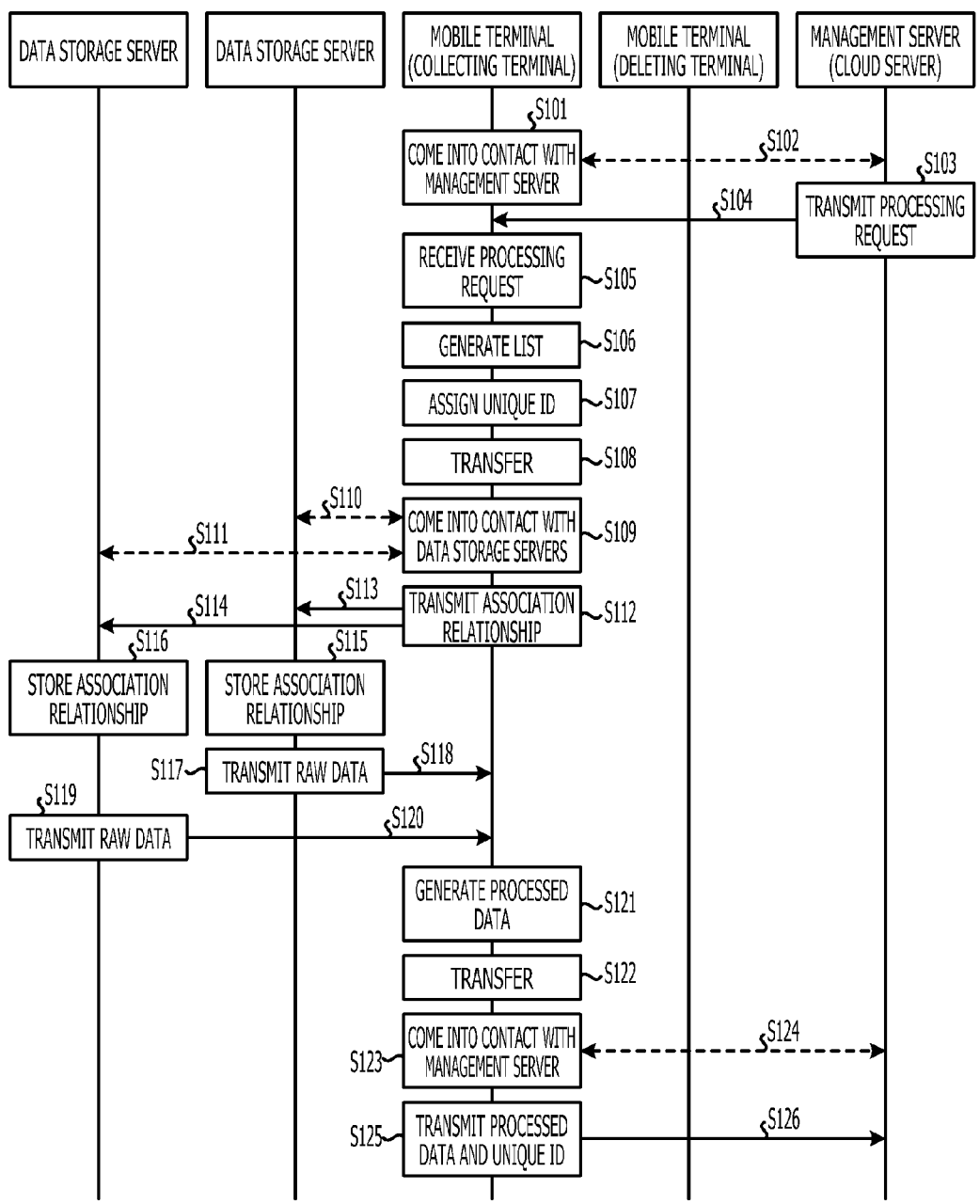
FIG. 6 is a sequence diagram of data processing that is executed by a system according to a first embodiment.

Next, a sequence of data processing that is executed by the system illustrated in FIG. 1 will be described. FIG. 6 is a sequence diagram of the data processing that is executed by the system according to the first embodiment.

As illustrated in FIG. 6, when a mobile terminal 10 comes into contact with the management server 40 (in S101 and S102), the management server 40 transmits a processing request to the mobile terminal 10 (in S103 and S104). For example, when the wireless communication unit 13 of the mobile terminal 10 detects a radio wave transmitted by the management server 40 and confirms the location of the management server 40, and the wireless communication unit of the management server 40 detects a radio wave transmitted by the mobile terminal 10 and confirms the location of the mobile terminal 10, the management server 40 transmits the processing request to the mobile terminal 10.

When the request reception unit 14 of the mobile terminal 10 receives the processing request (in S105), the list generation unit 15 generates, in accordance with the processing request, a list that indicates an association relationship between processed data to be generated and raw data (in S106).

Subsequently, the ID assignment unit 16 of the mobile terminal 10 assigns a unique ID to the list generated by the list generation unit 15 to generate an association list 12 (in S107). After that, the mobile terminal 10 stands by until a user who holds the mobile terminal 10 transfers to a location near the data storage servers 30 (in S108).

After that, when the mobile terminal 10 comes into contact with the data storage servers 30 (in S109 to S111), the ID notification unit 17 of the mobile terminal 10 extracts an association relationship between the raw data and the unique ID from the association list 12 generated by the ID assignment unit 16 and transmits the extracted association relationship to the data storage servers 30 (in S112 to S114).

After that, the list reception units 34 of the data storage servers 30 store, as the association lists 31, the association relationship between the raw data and the unique ID, which has been received from the mobile terminal 10 (in S115 and S116). Subsequently, the data transmission unit 35 of each data storage server 30 references the association list 31, reads the raw data held by each data storage server 30 from the storage 32, and transmits the read raw data to the mobile terminal 10 (in S117 to S120).

Then, the processed data generation unit 18 of the mobile terminal 10 uses the raw data received from the data storage servers 30 to generate the processed data (in S121). After that, the mobile terminal 10 stands by until the user who holds the mobile terminal 10 transfers to a location near the management server 40 (in S122). When the mobile terminal 10 comes into contact with the management server 40 (in S123 and S124), the processed data transmission unit 19 of the mobile terminal 10 transmits a combination of the generated processed data and the unique ID to the management server 40 (in S125 and S126).

Data Deletion

Figure 7:
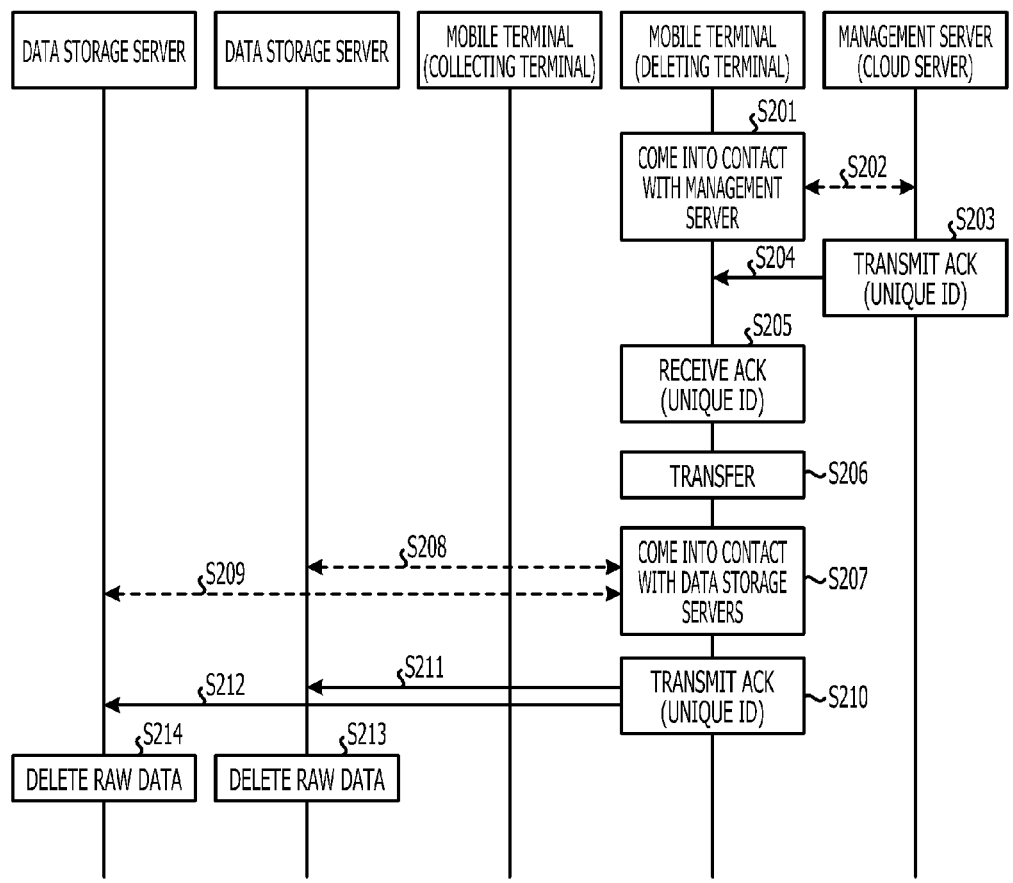
FIG. 7 is a sequence diagram of data deletion that is executed by a system according to a first embodiment.

Next, a sequence of data deletion that is executed by the system illustrated in FIG. 1 will be described. FIG. 7 is a sequence diagram of the data deletion that is executed by the system according to the first embodiment.

As illustrated in FIG. 7, when a mobile terminal 10 comes into contact with the management server 40 (in S201 and S202), the management server 40 transmits an ACK containing the unique ID to the mobile terminal 10 (in S203 and S204). Upon receiving the ACK (in S205), the mobile terminal 10 stands by until a user who holds the mobile terminal 10 transfers to a location near the data storage servers 30 (in S206).

After that, when the mobile terminal 10 comes into contact with the data storage servers 30 (in S207 to S209), the ID notification unit 17 of the mobile terminal 10 transmits the ACK containing the unique ID to the data storage servers 30 (in S210 to S212).

In each data storage server 30, the ACK reception unit 36 extracts the unique ID from the ACK. The deletion unit 37 identifies the raw data associated with the unique ID on the basis of the association lists 31 and deletes the identified raw data from the storage 32 (in S213 and S214).

Flowchart

Next, processes that are executed by the devices according to the first embodiment will be described. Specifically, a process to be executed by a collecting terminal, a process to be executed by a deleting terminal, a process to be executed by the data storage servers 30 and a process to be executed by the management server 40 will be described.

Collecting Terminal

Figure 8:
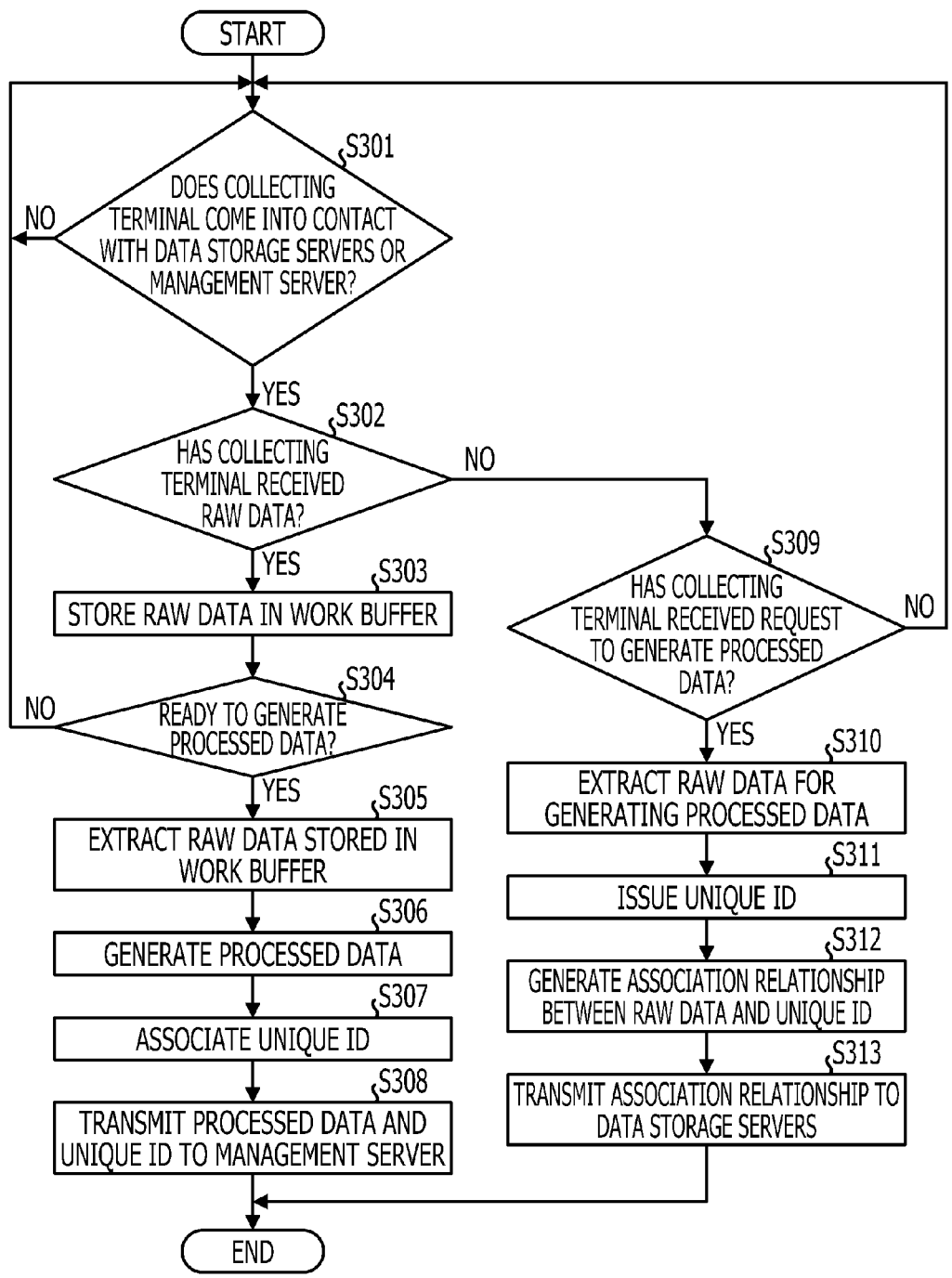
FIG. 8 is a flowchart of a process that is executed by a collecting terminal.

FIG. 8 is a flowchart of the process that is executed by the collecting terminal. The collecting terminal that is described with reference to FIG. 8 has the same configuration as the mobile terminal 10 illustrated in FIG. 2. As illustrated in FIG. 8, when the collecting terminal comes into contact with the data storage servers 30 or the management server 40 (Yes in S301), the collecting terminal determines whether or not the collecting terminal has received raw data (in S302).

When the collecting terminal determines that the collecting terminal has received the raw data (Yes in S302), the collecting terminal stores the received raw data in the work buffer 11 (in S303) and determines whether it is ready to generate processed data (in S304). Specifically, the collecting terminal determines whether or not the collecting terminal has collected all the raw data to be used for generating the processed data. When the collecting terminal determines that it is not ready to generate the processed data, that is, the collecting terminal has not received any of the raw data (No in S304), the collecting terminal causes the process to return to S301 to repeat S301 and later.

When the collecting terminal determines that it is ready to generate the processed data, that is, the collecting terminal has received all the raw data (Yes in S304), the collecting terminal reads the raw data from the work buffer 11 (in S305), and processes the raw data to generate processed data (in S306).

Subsequently, the collecting terminal associates a unique ID with the generated processed data (in S307), and transmits, through the near field wireless communication, the processed data and the unique ID to the management server 40 detected as being wirelessly communicable (in S308).

When the collecting terminal determines that the collecting terminal has not received raw data (No in S302), the collecting terminal determines whether or not the collecting terminal has received a request to generate processed data, that is, a processing request (in S309). When the collecting terminal determines that the collecting terminal has not received a request to generate the processed data (No in S309), the collecting terminal causes the process to return to S301 to repeat S301 and later.

When the collecting terminal determines that the collecting terminal has received a request to generate the processed data (Yes in S309), the collecting terminal extracts information regarding the raw data to be used for generating the processed data from the processing request (in S310).

Subsequently, the collecting terminal issues a unique ID for the processed data to be generated (in S311) and generates an association relationship between the raw data to be used for generating the processed data and the unique ID (in S312). After that, the collecting terminal transmits the generated association relationship to the data storage servers 30 (in S313).

Deleting Terminal

Figure 9:
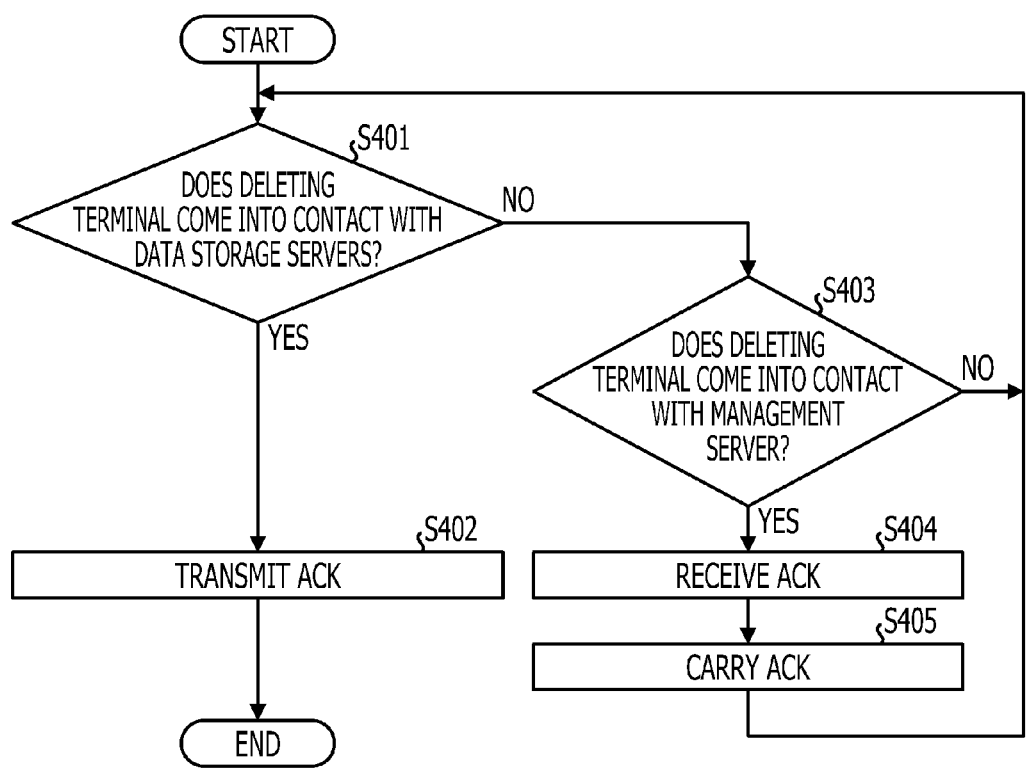
FIG. 9 is a flowchart of a process that is executed by a deleting terminal.

FIG. 9 is a flowchart of the process that is executed by the deleting terminal. The deleting terminal that is described with reference to FIG. 9 has the same configuration as the mobile terminal 10 illustrated in FIG. 2. As illustrated in FIG. 9, when the deleting terminal comes into contact with the data storage servers 30 (Yes in S401), the deleting terminal transmits, to the data storage servers 30, an ACK received from the management server 40 (in S402).

When the deleting terminal does not come into contact with the data storage servers 30 and comes into contact with the management server 40 (No in S401 and Yes in S403), the deleting terminal receives an ACK from the management server 40 (in S404) and carries the ACK to the data storage servers 30 along a transfer path of a user who holds the deleting terminal (in S405). After that, the deleting terminal causes the process to return to S401 to repeat S401 and later. When the deleting terminal comes into contact with none of the data storage servers 30 and the management server 40 (No in S401 and No in S403), the deleting terminal causes the process to return to S401 to repeat S401 and later.

Data Storage Servers

Figure 10:
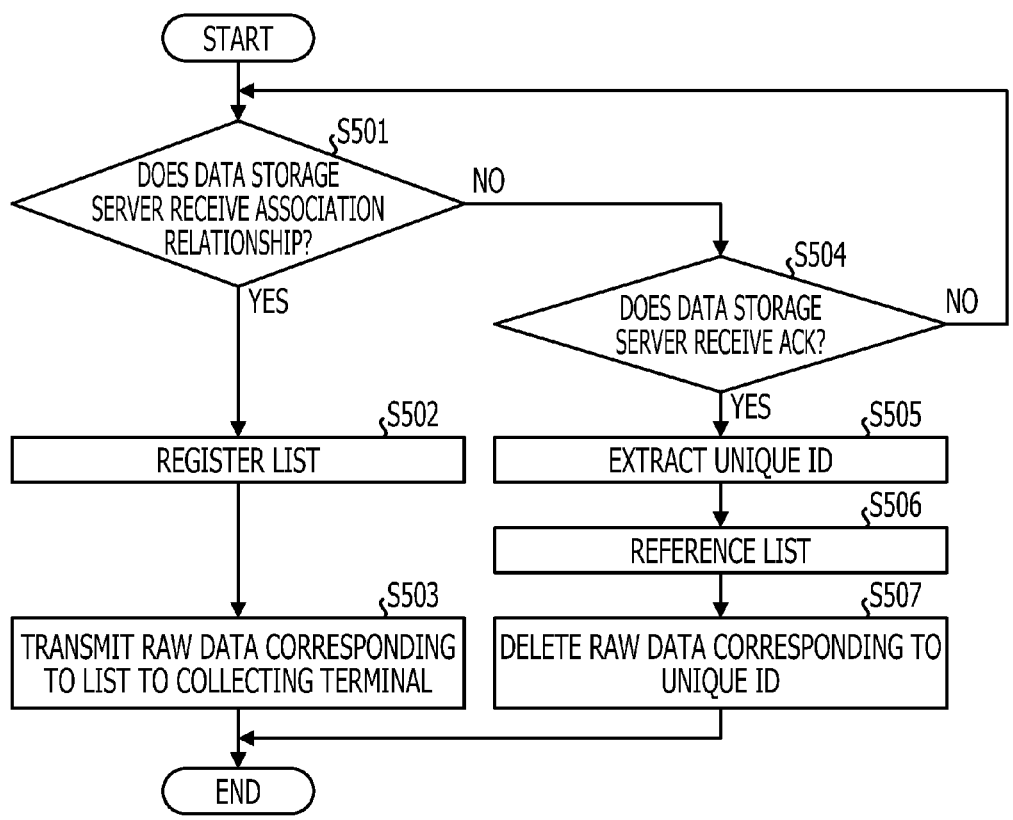
FIG. 10 is a flowchart of a process that is executed by a data storage server.

FIG. 10 is a flowchart of the process that is executed by each of the data storage servers 30. As illustrated in FIG. 10, when a data storage server 30 receives the association relationship between the raw data and the unique ID from the collecting terminal (Yes in S501), the data storage server 30 generates a association list 31 on the basis of the received association relationship and register the generated association list 31 in the data storage server 30 (in S502).

The data storage server 30 references the held association list 31, identifies the raw data stored in the storage 32 of the data storage server 30, reads the identified raw data from the storage 32 and transmits the read raw data to the collecting terminal (in S503).

When the data storage server 30 receives the ACK from the collecting terminal instead of the association relationship between the raw data and the unique ID (No in S501 and Yes in S504), the data storage server 30 extracts the unique ID from the received ACK (in S505).

Then, the data storage server 30 references the association list 31 held by the data storage server 30, identifies the raw data corresponding to the extracted unique ID, and deletes the identified raw data from the storage 32 (in S506 and S507). When the data storage server 30 receives none of the ACK and the association relationship between the raw data and the unique ID from the collecting terminal (No in S501 and No in S504), the data storage server 30 causes the process to return to S501 to repeat S501 and later.

Management Server

Figure 11:
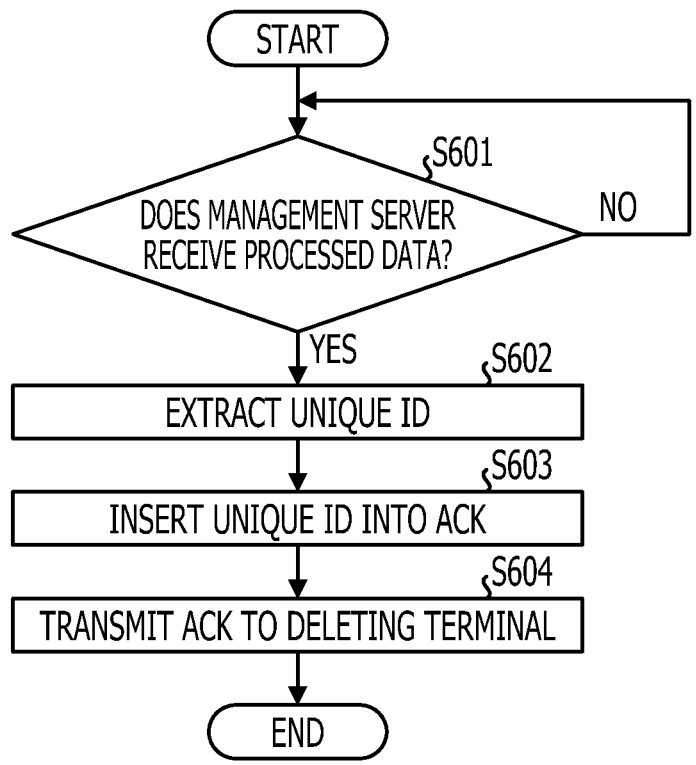
FIG. 11 is a flowchart of a process that is executed by a management server.

FIG. 11 is a flowchart of the process that is executed by the management server 40. As illustrated in FIG. 11, when the management server 40 receives the processed data from the collecting terminal through the near field wireless communication (Yes in S601), the management server 40 extracts the unique ID that has been associated with the processed data (in S602). After that, the management server 40 inserts the unique ID into the ACK (in S603) and transmits, through the near field wireless communication, the ACK to the deleting terminal detected as being wirelessly communicable with the management server 40 (in S604).

Effects

According to the first embodiment, the management server 40 may use transfer path of the user holding the mobile terminal 10 and collect data through the near field wireless communication using Wi-Fi or the like. Since the management server 40 collects data through the near field wireless communication using Wi-Fi or the like, a communication cost may be reduced. In addition, since the management server 40 uses the mobile terminal 10 held by the user, the cost of introducing the system may be reduced.

Second Embodiment

The first embodiment describes the example in which the mobile terminal 10 receives a processing request from the management server 40, transfers to a location near the data storage servers 30 and generates processed data. Embodiments, however, are not limited to the aforementioned example.

For example, Wi-Fi or ad-hoc communication may be used to carry a processing request transmitted by the management server 40 to a mobile terminal located near the data storage servers 30. The second embodiment describes examples in which mobile terminals relay a processing request, a deletion request and the like.

Figure 12:
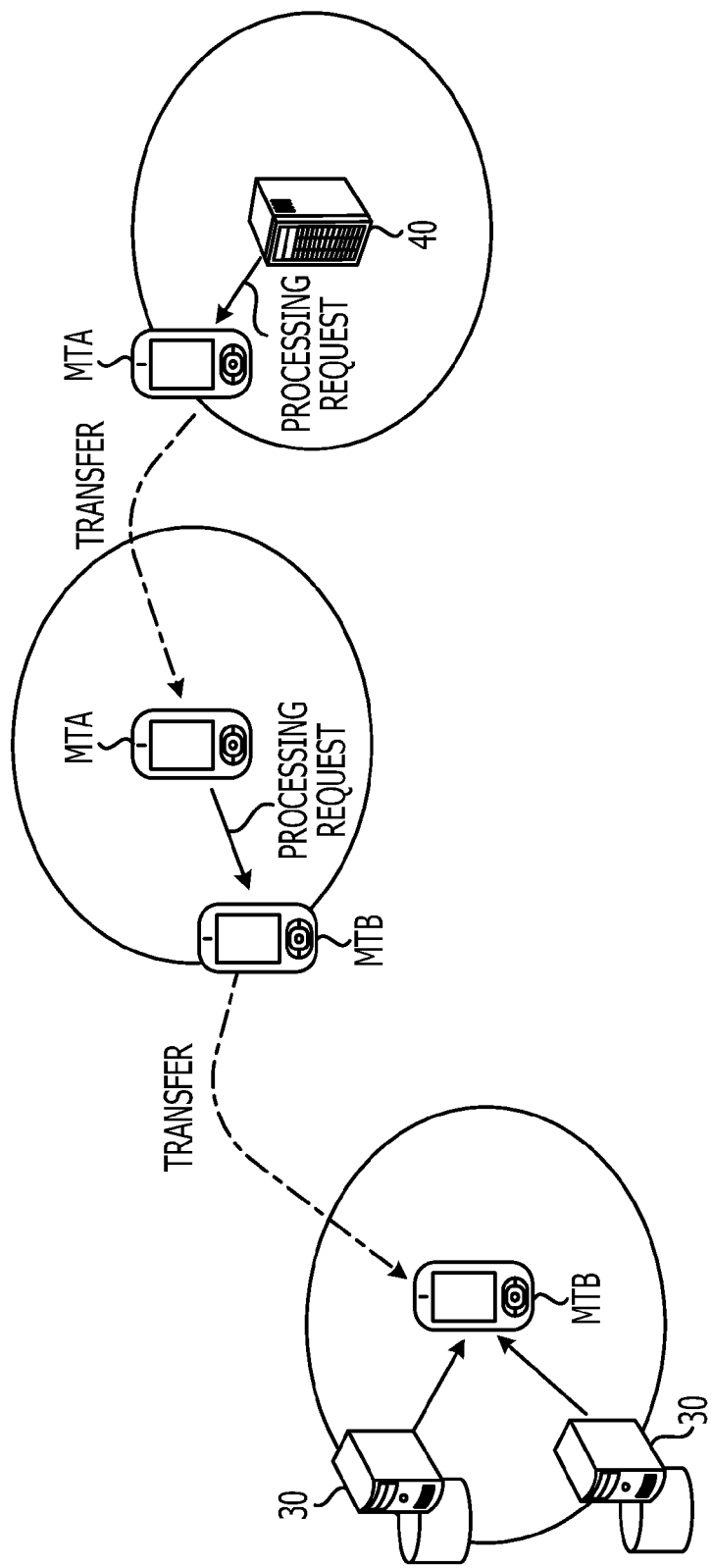
FIG. 12 is a diagram describing a flow in which mobile terminals relay a request.

FIG. 12 is a diagram describing the flow in which the mobile terminals relay a request. The devices illustrated in FIG. 12 are assumed to communicate by using Wi-Fi or execute ad-hoc communication. Each device periodically transmits a radio wave and determines whether or not another device communicable with each device exists.

As illustrated in FIG. 12, when the management server 40 detects the mobile terminal MTA located close enough to the management server 40 to communicate with the management server 40, the management server 40 transmits a processing request to the mobile terminal MTA. At this time, the mobile terminal MTA may generate an association list of processed data to be generated, raw data, and a unique ID on the basis of the processing request.

Then, the mobile terminal MTA transfers to a predetermined location as the user holding the mobile terminal MTA transfers. And there, when the mobile terminal MTA detects the mobile terminal MTB located close enough to the mobile terminal MTA to communicate with the mobile terminal MTA, the mobile terminal MTA transfers the processing request to the mobile terminal MTB. At this time, the mobile terminal MTA may transmit the association list to the mobile terminal MTB instead of the processing request.

After that, the mobile terminal MTB transfers, while holding the processing request or the association list, to a certain location as the user holding the mobile terminal MTB transfers. And there, when the mobile terminal MTB detects the data storage servers 30 located close enough to the mobile terminal MTB to communicate with the mobile terminal MTB, the mobile terminal MTB transmits the association list or the processing request to the data storage servers 30 and collects raw data. Then, the mobile terminal MTB holds the processed data, the raw data, and the unique ID in association with one another.

After that, in a similar method to the aforementioned method, an association relationship between the processed data generated by the mobile terminal MTB and the unique ID is transmitted from the mobile terminal MTB through another mobile terminal to the management server 40. The management server 40 that has received the processed data transmits an ACK containing the unique ID to a mobile terminal neighboring the management server 40. The ACK is transmitted to the data storage servers 30 by a similar method to the method described with reference to FIG. 12. Thus, even when the mobile terminals relay various requests, a common unique ID within the system may be transferred, and the amount of traffic may be suppressed.

Figure 13:
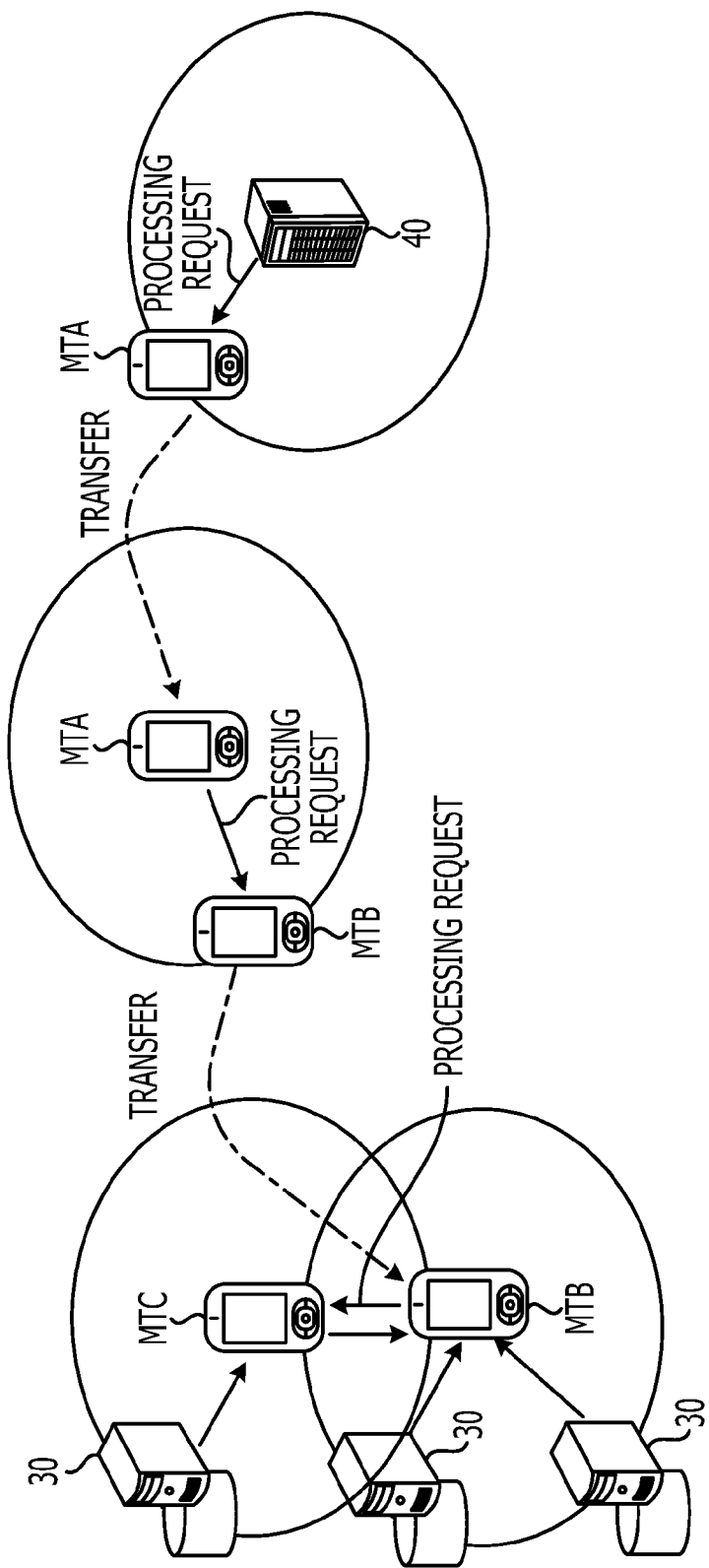
FIG. 13 is a diagram illustrating an example in which a mobile terminal collects raw data through another mobile terminal.

FIG. 13 is a diagram illustrating an example in which the mobile terminal MTB collects raw data through another mobile terminal. The devices illustrated in FIG. 13 have similar functions to the devices illustrated in FIG. 12.

As illustrated in FIG. 13, when the management server 40 detects the mobile terminal MTA located close enough to the management server 40 to communicate with the management server 40, the management server 40 transmits a processing request to the mobile terminal MTA. At this time, the mobile terminal MTA may generate an association list of processed data to be generated, raw data, and a unique ID on the basis of the processing request.

Then, the mobile terminal MTA transfers to a predetermined location as the user holding the mobile terminal MTA transfers. And there, when the mobile terminal MTA detects the mobile terminal MTB located close enough to the mobile terminal MTA to communicate with the mobile terminal MTA, the mobile terminal MTA transfers the processing request to the mobile terminal MTB. At this time, the mobile terminal MTA may transmit the association list instead of the processing request.

After that, the mobile terminal MTB transfers, while holding the processing request or the association list, to a certain location as the user holding the mobile terminal MTB transfers. And there, when the mobile terminal MTB detects a part of the data storage servers 30, which is located close enough to the mobile terminal MTB to communicate with the mobile terminal MTB, the mobile terminal MTB transmits the association list or the processing request to the detected a part of the data storage servers 30 and collects a part of raw data to be used for generating the processed data.

And there, when the mobile terminal MTB detects a mobile terminal MTC located close enough to the mobile terminal MTB to communicate with the mobile terminal MTB, the mobile terminal MTB transmits the association list or the processing request to the detected mobile terminal MTC and requests the mobile terminal MTC to collect the raw data.

When the mobile terminal MTC detects a part of the data storage servers 30, which is located close enough to the mobile terminal MTC to communicate with the mobile terminal MTC, the mobile terminal MTC transmits the association list or the processing request to the detected a part of the data storage servers 30 and collects a part of the raw data. Then, the mobile terminal MTC transmits the collected raw data to the mobile terminal MTB.

After that, the mobile terminal MTB uses the raw data collected by the mobile terminal MTB and the raw data received from the mobile terminal MTC to generate the processed data. Then, the mobile terminal MTB holds the processed data, the raw data, and the unique ID in association with one another. After that, an association relationship between the processed data and the unique ID is carried to the management server 40 by using the method described with reference to FIG. 12.

As described above, even when a mobile terminal may communicate with only a part of the data storage servers 30, the mobile terminal may collect raw data by using another mobile terminal. Thus, the mobile terminal may collect raw data by using a method appropriate for states of radio waves in wireless communication, generate processed data and transmit the processed data to the management server 40.

Other Embodiments

The first and second embodiments have been described above. However, other various embodiments may be achieved. Thus, other embodiments will be described below.

Timing of Generation of Unique ID

The first embodiment describes the example in which a unique ID is assigned to processed data to be generated when a processing request is received. The timing of assigning the unique ID is not limited to this. For example, after the mobile terminal 10 collects raw data from the data storage servers 30 and generates processed data, the mobile terminal 10 may assign a unique ID to the processed data and generate an association list. The timing of assigning the unique ID may be arbitrarily changed on the basis of a processing load of the mobile terminal 10 or the like.

Data to be Transmitted in Real Time

After the mobile terminal 10 collects raw data from the data storage servers 30 and generates processed data, the mobile terminal 10 may determine, on the basis of the type of the processed data or the like, whether or not the processed data is data to be transmitted in real time. When the mobile terminal 10 determines that the processed data is data to be transmitted in real time, the mobile terminal 10 may transmit the generated processed data to the management server 40 through a 3G network or the like instead of the near field communication using Wi-Fi or the like. When the mobile terminal 10 determines that the processed data is not data to be transmitted in real time, the mobile terminal 10 transmits the generated processed data to the management server 40 through the near field wireless communication using Wi-Fi or the like.

In this manner, the mobile terminal 10 may transmit urgent processed data to the management server 40 without a delay. Examples of data to be transmitted in real time are processed data with an error, processed data with a high probability of occurrence of an error, and processed data that is not properly generated.

Mobile Terminals

The embodiments describe the examples in which the mobile terminals are mobile phones, smart phones or the like. However, other terminals may be used as the mobile terminals. For example, in-vehicle devices may be used as the mobile terminals. When the in-vehicle devices are used as the mobile terminals, other wireless communication may be used instead of Wi-Fi or the like.

Timing of Deletion

The embodiments describe that a single unique ID is associated with a single raw data item. When the management server 40 transmits a plurality of processing requests, a plurality of processed data items may be associated with a single raw data item. In this case, the data storage servers 30 may delete the raw data item when the data storage servers 30 receive all unique IDs, that is, ACKs corresponding to the processing requests. The data storage servers 30 may keep, without deleting, the raw data item corresponding to the unique ID contained in the ACK and may treat the raw data item as a data item that is not provided to a mobile terminal.

System

Among the processes described above in the embodiments, all or a part of the processes that are automatically executed may be manually executed. All or a part of the processes that are manually executed may be automatically executed by using a known method. The process procedures, the control procedures, the specific names and the information including the various types of parameters and data, which are described in the embodiments or illustrated in the drawings, may be arbitrarily changed unless otherwise specified.

The constituent elements of the devices illustrated in the drawings are functionally conceptual and need not be physically configured as illustrated. Specifically, specific forms of separation and integration of the constituent elements of the devices are not limited to those illustrated in the drawings, and all or a part of the constituent elements of the devices may be functionally or physically separated or integrated on an arbitrary basis on the basis of various types of loads or usage states. All or a part of the various processing functions that are executed by the devices may be achieved by CPUs analyzing and executing programs. Or, all or a part of the various processing functions that are executed by the devices may be achieved as hardware by a wired logic.

Hardware Configurations

Next, a hardware configuration of a mobile terminal will be described. The devices illustrated in FIG. 1 have similar configurations. Thus, a hardware configuration regarding a mobile terminal will be described below, and detailed descriptions of hardware configurations regarding other devices are omitted.

Figure 14:
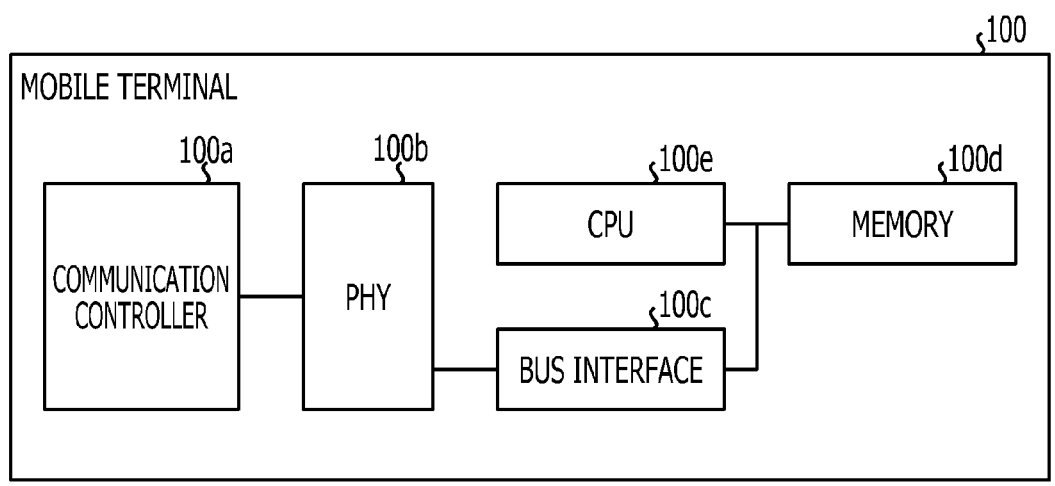
FIG. 14 is a diagram illustrating an example of hardware configurations of the mobile terminals.

FIG. 14 is a diagram illustrating an example of a hardware configuration of a mobile terminal. As illustrated in FIG. 14, a mobile terminal 100 includes a communication controller 100a, a physical layer (PHY) 100b, a bus interface 100c, a memory 100d and a CPU 100e.

The communication controller 100a is a processing unit that executes the near field wireless communication with other devices. For example, the communication controller 100a is an antenna or a network interface card. The PHY 100b is a physical layer hardware part. Operations related to a network connection and data transmission in the physical layer are defined in the PHY 100b. The PHY 100b achieves wireless communication with another device through the communication controller 100a. The PHY 100b may be provided as software.

The bus interface 100c is used to transmit and receive signals to and from the CPU 100e, the memory 100d, the PHY 100b and the like. The memory 100d is a storage device that includes a read-only memory (ROM) and a random access memory (RAM) and stores the association list, the data obtained in the processes and a program that causes the CPU 100e to execute various processes in a data collection method according to the embodiments. The CPU 100e is a processing unit that implements the various processes of the mobile terminal 100 and executes the various processes in the data collection method according to the embodiments.

The CPU 100e reads programs for executing the processes of the processing units illustrated in FIGS. 2, 5, and the like. Then, the CPU 100e loads the read programs in the RAM and runs processes that execute the functions described with reference to FIGS. 2, 5, and the like. Specifically, the processes execute similar functions to functions of the request reception unit 14, the list generation unit 15, the ID assignment unit 16, the ID notification unit 17, the processed data generation unit 18, and the processed data transmission unit 19. In addition, the processes execute similar functions to functions of the list reception unit 34, the data transmission unit 35, the ACK reception unit 36 and the deletion unit 37. The mobile terminal 100 reads and executes the programs and thereby operates as an information processing device that executes the data collection method.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal, comprising:
a memory; and
a processor configured to:
receive a processing request transmitted from a management server;
transmit to a data storage device, on basis of the processing request, a transmission request for transmitting first data;
receive the first data from the data storage device;
generate second data on basis of the first data;
assign a first identifier to the second data;
transmit the second data in association with the first identifier to the management server;
transmit an association relationship between the first identifier and the first data to the data storage device;
receive, from the management server, a second identifier of data to be deleted; and
transmit the second identifier to the data storage device.

2. The mobile terminal according to claim 1, wherein the processor is configured to:
determine whether the second data is urgent data;
transmit the second data to the management server through near field wireless communication upon determining that the second data is not urgent data; and
transmit the second data to the management server through a communication line for a mobile phone upon determining that the second data is urgent data.

3. A data storage device, comprising:
a storage unit; and
a processor configured to:
receive, from a first mobile terminal, a transmission request for transmitting first data;
read, from the storage unit, the first data on basis of the transmission request;
transmit the first data to the first mobile terminal;
receive, from the first mobile terminal, an association relationship between a first identifier and the first data;
store, in the storage unit, the first identifier in association with the first data;
receive, from a second mobile terminal, a second identifier of data to be deleted; and
reference the storage unit to identify data associated with the second identifier.

4. The data storage device according to claim 3, wherein the processor is configured to:
delete the data to be deleted upon receiving all of identifiers stored in the storage unit in association with the data to be deleted.

5. A data collection system, comprising:
a data storage device including a storage unit;
a first mobile terminal including a first processor, the first processor configured to:
receive a processing request transmitted from a management server;
transmit to the data storage device, on basis of the processing request, a transmission request for transmitting first data;
receive the first data from the data storage device;
generate second data on basis of the first data;
assign a first identifier to the second data;
transmit the second data in association with the first identifier to the management server; and
transmit an association relationship between the first identifier and the first data to the data storage device;
a second mobile terminal including a second processor, the second processor configured to:
receive, from the management server, a second identifier of data to be deleted; and
transmit the second identifier of data to be deleted to the data storage device;
a third processor configured to:
receive the transmission request from the first mobile terminal;
read, from the storage unit, the first data on basis of the transmission request;
transmit the first data to the first mobile terminal;
receive, from the first mobile terminal, the association relationship between the first identifier and the first data;
store, in the storage unit, the first identifier in association with the first data;
receive, from the second mobile terminal, the second identifier of data to be deleted; and reference the storage unit to identify data associated with the second identifier.

6. The data collection system according to claim 5, wherein the first processor is configured to:
   determine whether the second data is urgent data;
   transmit the second data to the management server through near field wireless communication upon determining that the second data is not urgent data; and
   transmit the second data to the management server through a communication line for a mobile phone upon determining that the second data is urgent data.

7. The data collection system according to claim 5, wherein the third processor is configured to:
   delete the data to be deleted upon receiving all of identifiers stored in the storage unit in association with the data to be deleted.

* * * * *